United States Patent
Xu et al.

(10) Patent No.: US 12,375,165 B2
(45) Date of Patent: Jul. 29, 2025

(54) RANDOM ACCESS METHOD, TERMINAL DEVICE, NETWORK DEVICE AND STORAGE MEDIUM

(71) Applicant: GUANGDONG OPPO MOBILE TELECOMMUNICATIONS CORP., LTD., Guangdong (CN)

(72) Inventors: Weijie Xu, Dongguan (CN); Shukun Wang, Dongguan (CN); Chuanfeng He, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 581 days.

(21) Appl. No.: 17/691,550

(22) Filed: Mar. 10, 2022

(65) Prior Publication Data

US 2022/0201770 A1    Jun. 23, 2022

Related U.S. Application Data

(63) Continuation of application No. PCT/CN2019/109636, filed on Sep. 30, 2019.

(51) Int. Cl.
*H04B 7/185* (2006.01)
*H04W 24/08* (2009.01)
(Continued)

(52) U.S. Cl.
CPC ........ *H04B 7/18513* (2013.01); *H04W 24/08* (2013.01); *H04W 72/0446* (2013.01);
(Continued)

(58) Field of Classification Search
CPC ............. H04W 74/0841; H04W 24/08; H04W 72/0446; H04W 74/006; H04W 74/0866;
(Continued)

(56) References Cited

U.S. PATENT DOCUMENTS

| | | | |
|---|---|---|---|
| 10,554,293 B1 * | 2/2020 | Chin ................. | H04W 56/0065 |
| 2014/0044108 A1 | 2/2014 | Earnshaw et al. | |

(Continued)

FOREIGN PATENT DOCUMENTS

| | | |
|---|---|---|
| CN | 101682935 A | 3/2010 |
| CN | 103346829 A | 10/2013 |

(Continued)

OTHER PUBLICATIONS

The Partial Search report of the parallel EP application No. 19947778.7 dated on Jun. 9, 2022.

(Continued)

*Primary Examiner* — Thai Nguyen
(74) *Attorney, Agent, or Firm* — Ladas & Parry LLP

(57) ABSTRACT

Disclosed is a random access method, including: determining, by a terminal device, a target time according to an offset which is a time parameter related to a propagation delay between the terminal device and a network device; and transmitting, by the terminal device, a random access request to the network device based on the target time. Further disclosed are another five random access methods, a terminal device, a network device and a storage medium.

22 Claims, 6 Drawing Sheets

(51) Int. Cl.
  *H04W 72/0446* (2023.01)
  *H04W 74/00* (2009.01)
  *H04W 74/08* (2009.01)
  *H04W 74/0833* (2024.01)

(52) U.S. Cl.
  CPC ..... *H04W 74/006* (2013.01); *H04W 74/0841* (2013.01); *H04W 74/0866* (2013.01)

(58) Field of Classification Search
  CPC ........... H04W 56/002; H04W 74/0833; H04W 56/001; H04W 56/0055; H04W 74/004; H04W 56/0045; H04W 84/06; H04W 72/02; H04B 7/18504; H04B 7/2041; H04B 7/18513; H04L 5/0044
  See application file for complete search history.

(56) References Cited

U.S. PATENT DOCUMENTS

| | | | | |
|---|---|---|---|---|
| 2018/0343673 | A1* | 11/2018 | Chen | H04W 74/006 |
| 2019/0029049 | A1* | 1/2019 | Akkarakaran | H04W 72/046 |
| 2020/0008233 | A1* | 1/2020 | Xiong | H04W 76/27 |
| 2020/0351955 | A1* | 11/2020 | Jeon | H04W 80/02 |

FOREIGN PATENT DOCUMENTS

| | | | | |
|---|---|---|---|---|
| CN | 103348746 A | 10/2013 | | |
| CN | 109788548 A | 5/2019 | | |
| CN | 110098892 A | 8/2019 | | |
| WO | 2012106798 A1 | 8/2012 | | |
| WO | WO-2019195457 A1 * | 10/2019 | ......... | H04B 7/18504 |
| WO | WO-2021033094 A1 * | 2/2021 | ......... | H04B 7/18504 |

OTHER PUBLICATIONS

International Search Report (ISR) dated Jun. 30, 2020 for Application No. PCT/CN2019/109636.
Mediatek Inc.:'Physical layer control procedure in NR-NTN' 3GPP TSG RAN WG1 Meeting #97 R1-1906467 May 17, 2019.
Mediatek Inc.:'Views on User Plane Timers in NTN' 3GPP TSG-RAN WG2 Meeting #106 Tdoc R2-1905705 May 17, 2019.
The first Office Action of corresponding Chinese application No. 202210832271.8, dated Jun. 27, 2023.
The first Office Action of corresponding European application No. 19947778.7, dated Jun. 2, 2023.
The EESR of corresponding European application No. 19947778.7. dated Sep. 9, 2022.
The Extended European Search Report of corresponding European application No. 24174532.2, dated Jun. 4, 2024.

* cited by examiner

RANDOM ACCESS METHOD, TERMINAL DEVICE, NETWORK DEVICE AND STORAGE MEDIUM

CROSS-REFERENCE TO RELATED APPLICATION

This application is a continuation of International Application No. PCT/CN2019/109636, filed on Sep. 30, 2019, the content of which is incorporated herein by reference in its entirety.

TECHNICAL FIELD

The present disclosure relates to mobile communication technology, in particular to a random access method, a terminal device, a network device and a storage medium.

RELATED ART

Non terrestrial network (NTN) provides communication services to ground users by means of communications satellite communication. Compared with terrestrial cellular network communication, communications satellite communication has many unique advantages, such as not limited by user region, long communication distance and high stability. However, in terrestrial cellular network communication, signal transmission time between a terminal and a base station is short, and in NTN, signal transmission time between a terminal and a communications satellite is long. Therefore, when a random access procedure in terrestrial cellular network communication is applied to NTN, there will be situations in which interactive information between receiving terminals and the communications satellite is lost.

SUMMARY

Embodiments of the present disclosure provide a random access method, a terminal device, a network device and a storage medium.

In a first aspect, an embodiment of the present disclosure provides a random access method, including:
  determining, by a terminal device, a target time according to an offset; and
  transmitting, by the terminal device, a random access request to the network device based on the target time.

In a second aspect, an embodiment of the present disclosure provides a random access method, including:
  determining, by a terminal device, a starting time of a random access response (RAR) window according to an offset.

In a third aspect, an embodiment of the present disclosure provides a random access method, including:
  determining, by a terminal device, a target time slot according to an offset; and
  transmitting, by the terminal device, a physical uplink shared channel (PUSCH) for carrying uplink data of message 3 based on the target time slot.

In a fourth aspect, an embodiment of the present disclosure provides a random access method, including:
  monitoring, by a terminal device, a physical downlink control channel (PDCCH) carrying a contention resolution message based on an offset.

In a fifth aspect, an embodiment of the present disclosure provides a random access method, including:
  receiving, by a network device, a PUSCH carrying message 3 according to an offset.

In a sixth aspect, an embodiment of the present disclosure provides a random access method, including:
  configuring, by a network device, an offset to a terminal device, where the offset is used for the terminal device to control transmitting of a random access request or message 3, or control receiving of a random access response or a contention resolution message.

In a seventh aspect, an embodiment of the present disclosure provides a terminal device, including:
  a first determining unit configured to determine a target time according to an offset; and
  a first transmitting unit configured to transmit a random access request to the network device based on the target time.

In an eighth aspect, an embodiment of the present disclosure provides a terminal device, including:
  a second determining unit configured to determine a starting time of a RAR window according to an offset.

In a ninth aspect, an embodiment of the present disclosure provides a terminal device, including:
  a third determining unit configured to determine a target time slot according to an offset; and
  a second transmitting unit configured to transmit a PUSCH for carrying uplink data of message 3 based on the target time slot.

In a tenth aspect, an embodiment of the present disclosure provides a terminal device, including:
  a monitoring unit configured to monitor a PDCCH carrying a contention resolution message based on an offset.

In an eleventh aspect, an embodiment of the present disclosure provides a network device, including:
  a receiving unit configured to receive a PUSCH carrying message 3 according to an offset.

In a twelfth aspect, an embodiment of the present disclosure provides a network device, including:
  a configuring unit configured to configure an offset to a terminal device, where the offset is used for the terminal device to control transmission of a random access request or message 3, or reception of a random access response or a contention resolution message.

In a thirteenth aspect, an embodiment of the present disclosure provides a terminal device, including a processor and a memory for storing a computer program runnable on the processor, where when the processor is used to run the computer program, the steps of the random access method executed by the terminal device described above are implemented.

In a fourteenth aspect, an embodiment of the present disclosure provides a network device, including a processor and a memory for storing a computer program runnable on the processor, where when the processor is used to run the computer program, the steps of the random access method executed by the network device described above are implemented.

In a fifteenth aspect, an embodiment of the present disclosure provides a storage medium storing an executable program, where when the executable program is executed by a processor, the random access method executed by the terminal device described above is implemented.

In a sixteenth aspect, an embodiment of the present disclosure provides a storage medium storing an executable program, where when the executable program is executed by a processor, the random access method executed by the network device described above is implemented.

The random access method provided by the embodiments of the present disclosure includes: determining, by a terminal device, a target time according to an offset which is a time parameter related to a propagation delay between the terminal device and a network device; and transmitting, by the terminal device, a random access request to the network device based on the target time. The transmission of the random access request is controlled with the propagation delay between the terminal device and the network device. The influence of the propagation delay between the terminal device and the network device on the transmission of the random access request is considered at the transmitting side, so that the time when the random access request arrives at the network device is aligned with the reception of the random access request configured by the network.

DESCRIPTION OF EMBODIMENTS

In order to understand characteristics and technical contents of embodiments of the present disclosure in more detail, the implementation of the embodiments of the present disclosure is described in detail below with reference to the accompanying drawings. The accompanying drawings are only for reference and description, and are not used to limit the embodiments of the present disclosure.

Before the detailed description of the random access method provided by the embodiments of the present disclosure, the random access procedure in terrestrial cellular network communication is briefly described.

After a cell search process, downlink synchronization is achieved between a terminal device and the cell. Therefore, the terminal device can receive downlink data. However, uplink transmission can be performed only upon uplink synchronization achieved between the terminal device and the cell. The terminal device establishes a connection with the cell through a random access procedure (Random Access Procedure) and achieves uplink synchronization.

Main purposes of the random access are: (1) obtaining uplink synchronization; and (2) assigning a unique cell radio network temporary identifier (C-RNTI) to the terminal device.

The random access procedure can be triggered by the following events:

1. initial access by a UE to establish a radio connection: the UE changes from radio resource control (RRC) idle state (i.e. RRC_IDLE state) to RRC connected state (i.e. RRC_CONNECTED state), where RRC connection is not established in the RRC_IDLE state, and RRC connection is established in the RRC_CONNECTED state;

2. radio resource control (RRC) connection re-establishment procedure: to enable the UE to re-establish a radio connection after a radio link failure;

3. handover: the UE needs to establish uplink synchronization with a new cell;

4. downlink (DL) data arrival in RRC_CONNECTED state and when uplink (UL) synchronization status is non-synchronized;

5. UL data arrival in RRC_CONNECTED state and when UL synchronization status is non-synchronized or there is no available physical uplink control channel (PUCCH) resource for sending a scheduling request (SR); and 6. timing advance required for locating the terminal device when in RRC_CONNECTED state.

In a random access procedure, there includes a first type of random access and a second type of random access. In the first type of random access, information interaction needs to be performed four times between a terminal device and a network device; therefore, the first type of random access is also called 4-steps random access (4-steps RACH). In the second type of random access, information interaction needs to be performed two times between the terminal device and the network device. Therefore, the second type of random access is also called 2-steps random access (2-steps RACH).

Figure 1:
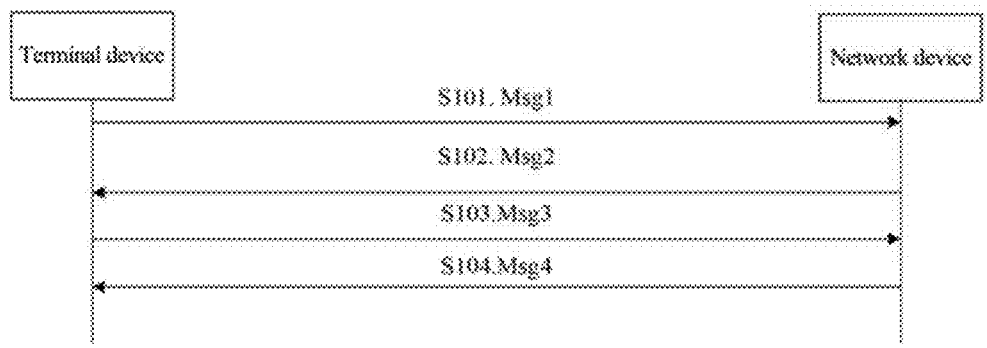
FIG. 1 is a schematic diagram of an optional processing flow for a random access according to the present disclosure.

A processing flow of the first type of random access, as shown in FIG. 1, includes the following four steps.

Step S101: a terminal device transmits a random access preamble to a network device through message 1 (Msg1).

The terminal device transmits the random access preamble to the network device to notify the network device of a random access request, and to enable the network device to estimate a transmission delay between the network device and the terminal device and thereby calibrate a uplink timing. The random access preamble can also be called preamble. In a new radio (NR) system, preamble is transmitted in a periodic random access occasion (RACH occasion, RO) configured by the network device. RO is a time-frequency resource of RACH.

Step S102: the network device transmits message 2 (Msg2) to the terminal device.

After detecting that the terminal device transmits the preamble, the network device transmits a RAR message to the terminal device through Msg2 to inform the terminal device of uplink resource information that can be used for transmitting Msg3, assigning a radio network temporary identity (RNTI) to the terminal device and providing a time advance command etc. to the terminal device.

After the terminal device transmits the preamble, a RAR window (RA Response window) is used to monitor to a PDCCH within the RAR window so as to receive a RAR message corresponding to a random access radio network temporary identifier (RA-RNTI). A window length of the RAR window is represented in a number of time slots, and the number of the time slots is configured by high-level signaling ra-ResponseWindow. A time slot length is determined for a reference subcarrier based on a subcarrier interval of a PDCCH common search space set configured for the terminal. The RAR window starts in the PDCCH common search space set configured for the terminal device after transmitting Msg1, and is at a control resource set (CORESET) at an earliest time position where the terminal receives PDCCH after at least one symbol after a last symbol of the RACH occasion where the terminal device transmits a physical random access channel (PRACH), and a symbol length of the at least one symbol corresponds to a subcarrier interval of the PDCCH common search space set.

If the terminal device does not receive a RAR message replied by the network device within the RAR window, it is considered that the random access procedure has failed this time. If the terminal device successfully receives a RAR message within the RAR window and a preamble index in the RAR message is the same as a preamble index sent by the terminal device, it is considered that the RAR message has been successfully received, and the UE can stop monitoring the RAR message.

A RAR message can contain response messages to multiple users sending preambles. A response message to each user includes a random access preamble identifier (RAPID) used by the user, TA adjustment information, temporary C-RNTI (TC-RNTI) and scheduling authorization information of message 3 (Msg3) etc. In NR, the RAR message is scheduled using downlink control information (DCI) format 1-0.

The scheduling authorization information of Msg3 contained in the RAR message is of 27 bits in total, as shown in Table 1:

TABLE 1

Authorization content in random access response message

| Domains in random access response authorization | Number of bits |
| --- | --- |
| Frequency hopping identity | 1 |
| PUSCH frequency-domain resource allocation | 14 |

TABLE 1-continued

Authorization content in random access response message

| Domains in random access response authorization | Number of bits |
| --- | --- |
| PUSCH time-domain resource allocation | 4 |
| Modulation and coding strategy | 4 |
| TPC command for PUSCH | 3 |
| Channel state information request | 1 |

Step S103: the terminal device transmits Msg3 to the network device.

If the terminal device successfully receives the RAR message, the terminal sends Msg3, that is, the PUSCH scheduled by the RAR message.

Corresponding to the PUSCH transmission slots scheduled by the RAR message, if the terminal device receives the PDSCH carrying RAR message at time slot n, the terminal transmits the PUSCH of Msg3 at time slot $n''=n+k_2+\Delta$, where a delay $\Delta$ is given in Table 2, and it can be seen that, $\Delta$ is determined by a subcarrier interval μPUSCH of Msg3.

TABLE 2

Definition of $\Delta$ value

| μPUSCH | $\Delta$ |
| --- | --- |
| 0 | 2 |
| 1 | 3 |
| 2 | 4 |
| 3 | 6 |

The above $k_2$ is determined from a corresponding value in a default domain resource allocation (TDRA) table or a TDRA table configured by a system message based on a domain value of "PUSCH time domain resource allocation" in Table 1. Take a default TDRA table shown in Table 3 below as an example. Assuming that the domain value of "PUSCH occasion resource allocation" is 0000, it indicates a first row in Table 3, and $k_2$ is j, where j further depends on the subcarrier interval of PUSCH in Msg3. If the subcarrier interval of PUSCH is 15 KHz, then in Table 4, μPUSCH=0 (the subcarrier interval of PUSCH is equal to $15*2^{\mu PUSCH}$) and then j=1, so it can be calculated from the above formula that $k_2$ is equal to 1. The subcarrier interval of PUSCH in Msg3 is equal to the subcarrier interval configured for an initial UL bandwidth part in system information.

TABLE 3

Default time domain resource allocation for PUSCH under normal CP

| Row index | PUSCH mapping type | $k_2$ | S | L |
| --- | --- | --- | --- | --- |
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |

TABLE 3-continued

Default time domain resource allocation for PUSCH under normal CP

| Row index | PUSCH mapping type | $k_2$ | S | L |
|---|---|---|---|---|
| 14 | Type B | j | 8 | 6 |
| 15 | Type A | j + 3 | 0 | 14 |
| 16 | Type A | j + 3 | 0 | 10 |

The value of j in Table 3 is determined by Table 4.

TABLE 4

Definition of a value of j

| $\mu_{PUSCH}$ | j |
|---|---|
| 0 | 1 |
| 1 | 1 |
| 2 | 2 |
| 3 | 3 |

Corresponding to the triggering events of random access, Msg3 carries the following information.

1. In the case of initial access, Msg3 is a RRC connection request transmitted on a common control channel (CCCH), and at least needs to carry NAS UE identifier information.

2. In the case of RRC connection re-establishment, Msg3 is a RRC connection re-establishment request transmitted on a CCCH, and does not carry any NAS message.

3. In the case of handover, Msg3 is an encrypted and integrity protected RRC Handover Confirm transmitted on a DCCH, and must include the C-RNTI of UE, and if possible, needs to carry a buffer status report (BSR).

4. For other triggering events, at least C-RNTI needs to be carried.

Uplink transmission usually uses UE specific information, such as C-RNTI, to scramble data for UL synchronization channel (SCH). However, the conflict has not been resolved at this time, and scrambling cannot be based on C-RNTI, but can only use TC-RNTI. That is, Msg3 will only use TC-RNTI for scrambling.

In S103, the UE will carry its own unique identifier in Msg3: C-RNTI or UE identifier (S-TMSI or a random number) from a core network Therefore, after the terminal device transmits Msg3, a media access control (MAC) entity of the terminal will start the following operations:

1> starting a random access contention resolution timer (ra-ContentionResolutionTimer) and restarting the ra-ContentionResolutionTimer at a first symbol after each Msg3 is retransmitted, and 2> monitoring the PDCCH during the operation of the Ra-ContentionResolutionTimer, that is, monitoring the contention resolution message transmitted by a network.

Step S104: the network device transmits Msg4 to the terminal device.

Msg4 includes a content resolution message and allocates uplink transmission resource for the terminal device.

In the contention resolution mechanism, the network device will carry a unique identifier in Msg4 to specify a winning terminal device. Other terminal devices that do not win in the contention solution will re-initiate random access. The PDCCH for Msg4 uses TC-RNTI for scrambling.

When receiving Msg4 transmitted by the network device, the terminal device will detect whether the terminal device specific temporary identifier transmitted by the terminal device in Msg3 is included in the conflict resolution message transmitted by the base station. If the terminal device specific temporary identifier in Msg3 is included in the conflict resolution message, it indicates that the random access procedure for the terminal device is successful; otherwise it is considered that the random access procedure has failed, and the terminal device needs to initial the random access procedure again from the first step.

Figure 2:
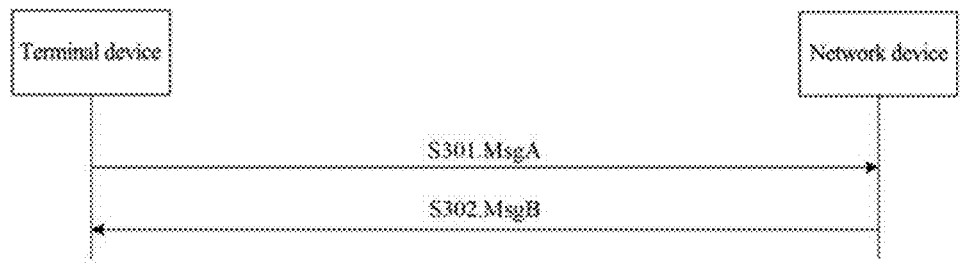
FIG. 2 is a schematic diagram of an optional processing flow for a random access according to the present disclosure.

Compared with the first type of random access, the second type of random access can increase a delay and reduce a signaling overhead at the same time. The processing flow of the second type of random access is shown in FIG. 2, including:

step S201: the terminal device transmits MsgA to the network device;

MsgA includes a preamble and uplink data (e.g. carried by PUSCH). The preamble is a content of Msg1 in the first type of random access; the uplink data carries identifier information of the UE and/or reason for the RRC request, which is the content of the Msg3 in the first type of random access; and step S202: the network device transmits MsgB to the terminal device;

MsgB includes contention resolution information, TA information, C-RNTI allocation information, etc. MsgB is equivalent to include Msg2 and Msg4 in the first type of random access.

In the 2-step RACH, when the terminal device has a random access demand, the terminal device transmits MsgA on the MsgA resource, that is, RACH Occasion and PUSCH Occasion, corresponding to the 2-step RACH that appears in the period configured by the network device. Then, the terminal device monitors the RAR message transmitted by the network device within the RAR window. It is foreseeable that in the 2-step RACH, the setting of the starting time position of the RAR window is similar to that in the 4-step RACH, which starts at a first PDCCH occasion configured for the terminal after transmitting MsgA.

In NR, the requirements of terrestrial cellular communication are mainly considered. In cellular communication, the cell radius is usually in the range of several hundred meters to several kilometers, and the propagation delay of uplink and downlink paths is relatively short, ranging from several microseconds (μs) to dozens of μs. Therefore, the path propagation delay has little influence on setting of various transmission timings.

Figure 3:
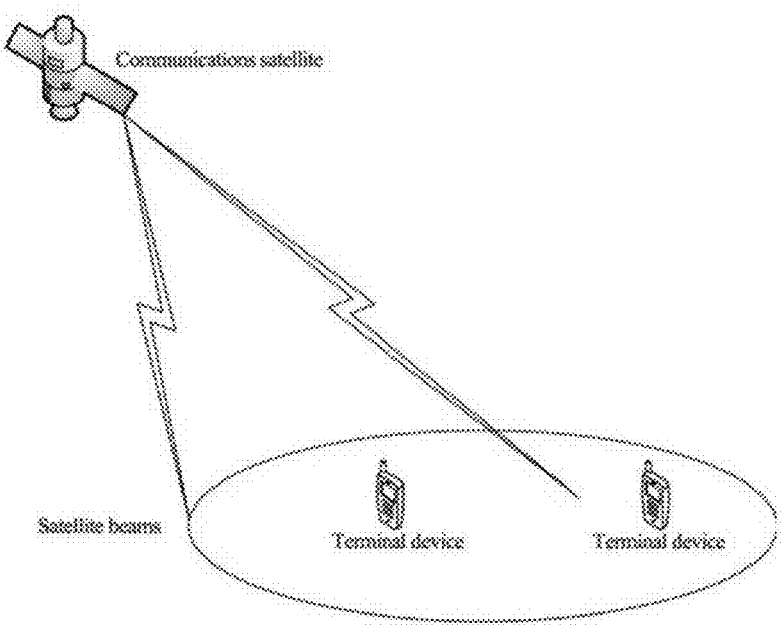
FIG. 3 is a schematic diagram of a communication link of a NTN according to the present disclosure.

Compared with the cellular network adopted by NR, a signal propagation delay between a UE and a communications satellite in NTN is greatly increased. A link of NTN is shown in FIG. 3. The communications satellite transmits satellite beams and exchange information with terminal devices within the coverage of satellite beams. In addition, due to a large coverage of the communications satellite, both the downlink (link from the communications satellite to the terminal device) and the uplink (link from the terminal device to the communications satellite) have significantly longer path propagation delay. A one-way propagation delay for low-earth orbit (LEO) communications satellite is in several microseconds, and a one-way propagation delay for geostationary earth orbit (GEO) communications satellite is in several hundred microseconds. Large propagation delay will affect the communication efficiency of the terminal device and the network device in random access procedure.

Based on the above problems, an embodiment of the present disclosure provides a random access method, and the random access method according to the embodiment of the present disclosure can be applied to a NTN system.

Figure 4:
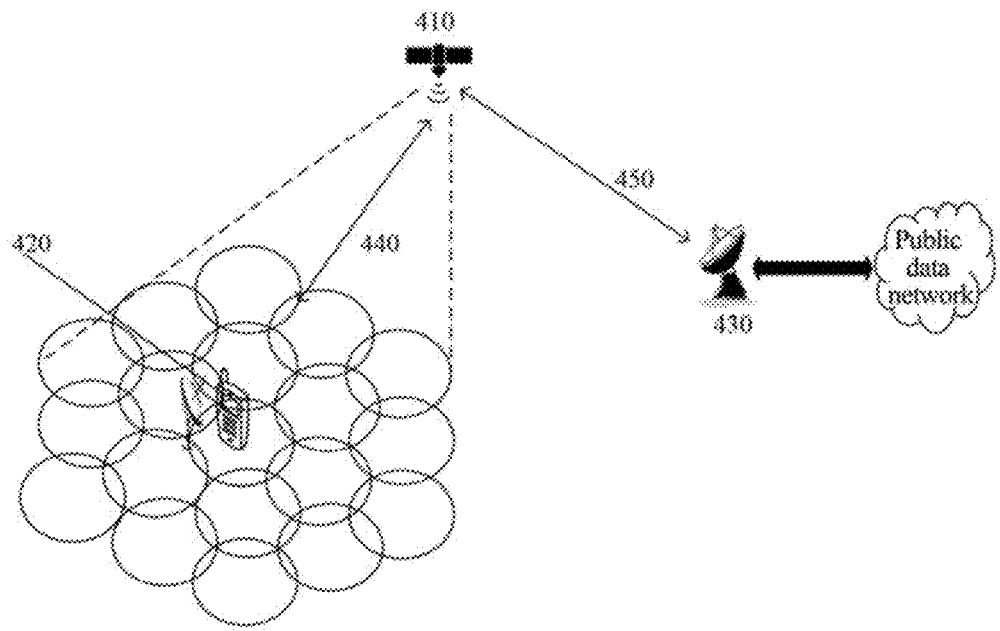
FIG. 4 is a schematic diagram of an optional structure of a communication system according to an embodiment of the present disclosure.

Exemplarily, a NTN system 400 applied in the embodiment of the present disclosure may be as shown in FIG. 4. The communication system 400 may include a network device 410, and the network device 410 may be a device communicating with a terminal device 420 (or called a communication terminal or a terminal). The network device 410 may provide communication coverage for a specific geographical area, and may communicate with terminal devices located in the coverage area to provide service for the terminal devices in the coverage area.

In an implementation, the network device 410 is a communications satellite or an unmanned aircraft system (UAS) platform. According to the difference of orbital heights, communications satellites are classified into LEO communications satellites, medium-earth orbit (MEO) communications satellites, GEO communications satellites, high elliptical orbit (HEO) communications satellites, etc. Among them, altitude range of LEO communications satellites is 500 km~1,500 km, and corresponding orbit period is about 1.5 hours~2 hours. Signal propagation delay of single hop communication between users (what is called single hop communication) is generally less than 20 ms. Maximum visible time of communications satellites is 20 minutes. Signal propagation distance is short, link loss is small, and requirement for transmission power of the user terminal is not high. A geostationary earth orbit communications satellite has an orbit height of 35,786 km and a rotation period of 24 hours around the earth. A signal propagation delay of single hop communication between users is generally 250 ms.

In order to ensure the coverage of communications satellite and increase system capacity of the whole communications satellite communication system, the communications satellite use multiple beams to cover the ground, and a communications satellite can form dozens or even hundreds of beams to cover the ground; and a communications satellite beam can cover a ground area in a diameter of tens to hundreds of kilometers.

The communication system 400 further includes at least one terminal device 420 located within the coverage of the network device 410. The "terminal device" used herein includes, but is not limited to, a device configured to receive/transmit communication signals for communications satellite network; and/or an Internet of things (JOT) device. A terminal device configured to communicate through a radio interface may be referred to as a "radio communication terminal", a "radio terminal" or a "mobile terminal". Examples of the mobile terminal include, but are not limited to, a communications satellite phone; a personal communications system (PCS) terminal that can combine the communications satellite phone with data processing, faxing and data communication capabilities; a PDA that can include a radio phone, a pager, an Internet/Intranet access, a Web browser, a notebook, a calendar, and/or a global positioning system (GPS) receiver; and a conventional laptop and/or a handheld receiver or other electronic devices including a radio phone transceiver. The terminal device can refer to an access terminal, a user equipment (UE), a user unit, a user station, a mobile station, a remote station, a remote terminal, a mobile device, a user terminal, a terminal, a wireless communication device, a user agent or a user device. The access terminal can be a cordless phone, a session initiation protocol (SIP) phone, a wireless local loop (WLL) station, a personal digital assistant (PDA), a handheld device with wireless communication function, a computing device or other processing devices connected to wireless modems, an in-vehicle device, a wearable device, a terminal device in 5G networks, or a terminal device in future evolutional PLMN, etc.

The network device 410 communicates with the terminal device 420 through a service link or a wireless link 440. The network device 410 may communicate with a gateway 430 based on a feeder link or a wireless link 450, and connect to a public data network through the gateway 430.

Figure 5:
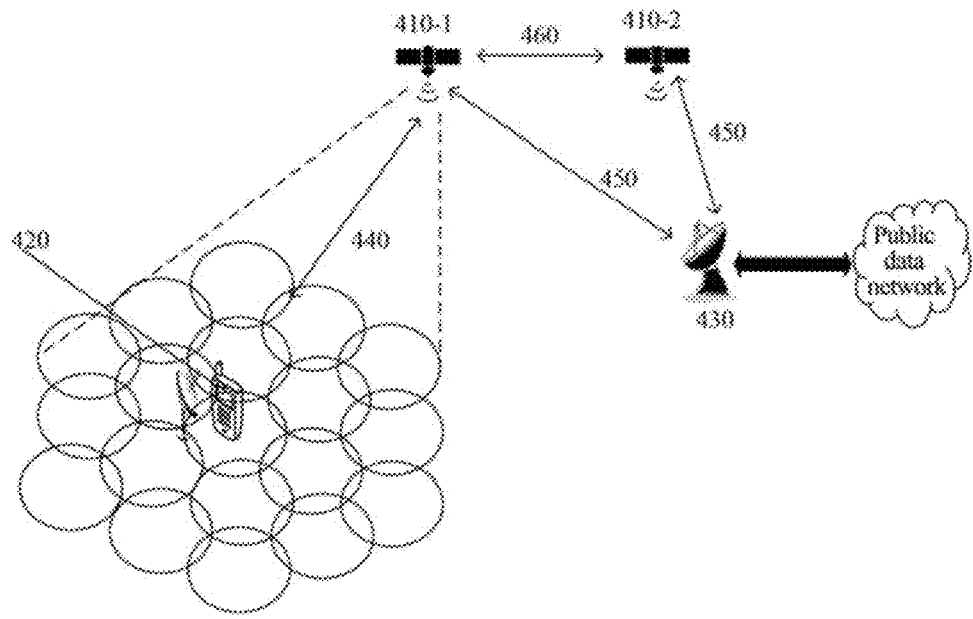
FIG. 5 is a schematic diagram of an optional structure of a communication system according to an embodiment of the present disclosure.

In an example, as shown in FIG. 5, the network device 410 in the communication system 400 includes a network device 410-1 and a network device 410-2, where the network device 410-1 communicates with the network device 410-2 through inter-satellite links (ISL) 460, and the network device 410-1 is used to transparently transmit payload: radio frequency filtering, frequency conversion and amplification, and the signal is not changed through the transparent transmission network device 410-1. The network device 410-2 is used to regenerate payload: radio frequency filtering, frequency conversion and amplification, as well as demodulation and decoding, conversion and/or routing, encoding and modulation.

It should be understood that a device with a communication function in a network/system in the embodiments of the present disclosure may be referred to as a communication device. Taking the communication system 400 shown in FIG. 4 or FIG. 5 as an example, the communication device may include the network device 410 and the terminal device 420 having communication functions. The network device 410 and the terminal device 420 may be specific devices described above, which will not be repeated here; the communication device may also include other devices in the communication system 400, such as other network entities such as UAS, which is not limited in the embodiments of the present disclosure.

Figure 6:
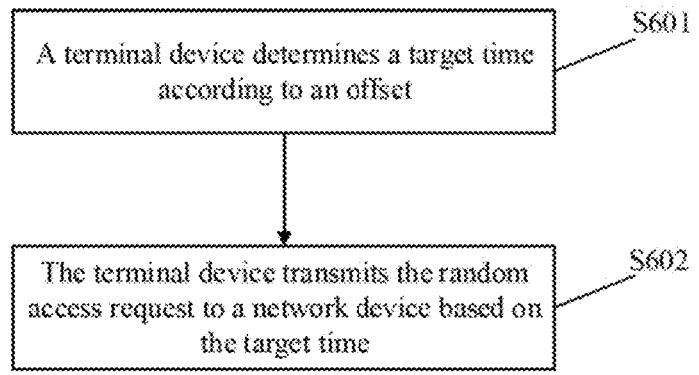
FIG. 6 is a schematic diagram of an optional processing flow for a random access method according to an embodiment of the present disclosure.

An optional processing procedure for a random access method provided by an embodiment of the present disclosure, as shown in FIG. 6, includes the following steps.

Step S601: a terminal device determines a target time according to an offset.

The offset K_offset is a time parameter related to a propagation delay between the terminal device and a network device.

The representation of the offset includes at least one of the following: an amount of time and a number of time slots.

In an example, the offset is the amount of time with a unit of ms. In an example, the offset is the number of the time slots and a reference subcarrier interval is predefined or configured. In an example, the offset is a combination of the number of the time slots and a number of symbols, and the reference subcarrier interval is predefined or configured.

In the embodiment of the present disclosure, the offset is greater than or equal to the propagation delay between the terminal device and the network device. For example, the offset is the propagation delay between the terminal device and the network device. In another example, the offset is twice the propagation delay between the terminal device and the network device.

In the embodiment of the present disclosure, the offset is predefined by the terminal device; or the offset is configured by the network device.

In the case that the offset is configured by the network device, the offset is configured by the network device through at least one of the following signaling: a system broadcast message; a physical downlink control channel (PDCCH) signaling; a radio resource control signaling; a media access control control element signaling.

Figure 7:
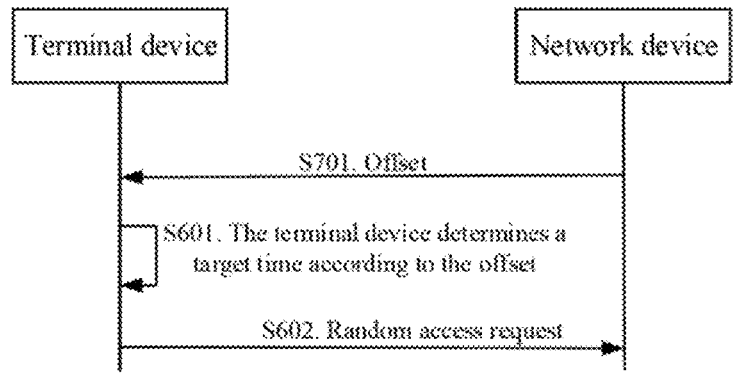
FIG. 7 is a schematic diagram of an optional processing flow for a random access method according to an embodiment of the present disclosure.

In the case that the offset is configured by the network device, before step S601, as shown in FIG. 7, the method includes:

step S701: a network device configures the offset to the terminal device.

The offset is used for the terminal device to control an interaction of messages in a random access procedure. In an implementation, the offset is used for the terminal device to control the transmission of random access request or message 3, or the reception of random access response or contention resolution message.

In an implementation, step S701 includes: the network device transmits a configuration message carrying the offset to the terminal device.

The configuration message includes at least one of the following: a system broadcast message; a physical downlink control channel (PDCCH) signaling; a radio resource control signaling; a media access control control element signaling.

In the embodiment of the present disclosure, the target time represents a time configured by the network to receive the random access request transmitted by the terminal device. In an implementation, the target time is a PRACH resource configured by the network device to receive the random access request transmitted by the terminal device. The PRACH resource may be a periodic resource.

In an implementation, the random access request is Msg1. At this time, the random access is the first type of random access. In the case where the random access is the first type of random access, step S601 can be performed as: determining a random access occasion according to the offset.

The terminal device determines available random access occasions according to the offset, and selects a random access occasion among the available random access occasions.

In an implementation, the determining the random access occasion according to the offset includes determining the random access occasion in a PRACH resource after a duration corresponding to the offset after a triggering time of random access.

The PRACH resource after the duration corresponding to the offset after the triggering time of random access is the PRACH resource at a time after the triggering time of random access is offset by the duration corresponding to K_offset, and in an implementation, at a time corresponding to the triggering time of random access offset forward by the duration corresponding to the K_offset.

In an example, the triggering time of random access is T1, and the time at a duration corresponding to the K_offset after T1 is T2, the terminal device determines the random access occasion in the PRACH resource after T2.

Taking high-level triggering as the triggering mode as an example, the terminal device determines available RACH occasions in the PRACH resource at a time after the offset K_offset after the triggering time of the high-level triggering random access, and selects the RACH occasion from the available RACH occasions.

In an implementation, a next available RACH occasion in the PRACH resource at a time after the duration corresponding to the offset K_offset after the triggering time of the high-level triggering random access can be used as the target time.

In an implementation, the triggering events of high-level triggering random access include the following triggering events:

1). UL data arrival in RRC_CONNECTED state and when UL synchronization status is non-synchronized or there is no available PUCCH resource for sending a SR;
2). initial access by a UE to establish a radio connection;
3). RRC connection re-establishment process; and
4). handover.

Taking a PDCCH order as the triggering mode as an example, the terminal device determines the random access occasion in the PRACH resource according to a last symbol of the PDCCH order and the offset, and the time interval between the last symbol of the PDCCH order and a first symbol of the random access occasion is greater than the duration corresponding to the offset.

In an example, the time corresponding to the last symbol of the PDCCH order is T3, and the time at the duration corresponding to the K_offset after T3 is T4, the terminal device determines the random access occasion in the PRACH resource after T4.

The terminal device determines available RACH occasions in the PRACH resource after a time corresponding to a duration of greater than the offset K_offset after the last symbol of the PDCCH order, and selects a RACH occasion as the target time from the available RACH occasions.

In an implementation, a time interval between the last symbol of the PDCCH order and a first symbol of the RACH occasion as the target time is greater than or equal to a time interval K, and the time interval K can be calculated by formula (1), $$K = N_{T,2} + \Delta_{BWPSwitching} + \Delta_{Delay} + K\_offset, \quad \text{Formula (1)}$$

$N_{T,2}$ is a time length of $N_2$ symbols corresponding to PUSCH preparation time of rel-15 terminal processing capacity 1, $\Delta_{BWPSwitching}$ is a bandwidth part (BWP) handover delay. If the active UL bandwidth part (BWP) of the terminal does not change, the BWP handover delay $\Delta_{BWPSwitching}=0$, otherwise, the value of the BWP handover delay $\Delta_{BWPSwitching}$ can refer to the definition in Table 5. $\Delta_{Delay}$ is a time delay. For frequency range (FR) 1, the time delay $\Delta_{Delay}=0.5$ ms, and for the FR2, the time delay $\Delta_{Delay}=0.25$ ms.

TABLE 5

| | | BWP handover delay | |
|---|---|---|---|
| | NR slot | BWP handover delay $\Delta_{BWPswitchDelay}$ (time slot) | |
| μ | length (ms) | Type 1 | Type 2 |
| 0 | 1 | 1 | 3 |
| 1 | 0.5 | 2 | 5 |
| 2 | 0.25 | 3 | 9 |
| 3 | 0.125 | 6 | 18 |

$\Delta_{BWPSwitchDelay}$ in Type 1 depends on the UE capability.
$\Delta_{BWPSwitchDelay}$ in Type 2 depends on that, if the BWP handover involves a change in the subcarrier interval, and the BWP handover delay is a larger one between the subcarrier interval before the BWP handover and the subcarrier interval after the BWP handover.

The triggering events of PDCCH order triggering random access include the following triggering events:

1). DL data arrival in RRC_CONNECTED state and when UL synchronization status is non-synchronized; and
2). timing advance required for locating the terminal device when in RRC_CONNECTED state.

In an implementation, the random access request is MsgA. At this time, the random access is a second type of random access. In the case that the random access is the second type of random access, step S601 can be performed as: determining a random access occasion and a PUSCH occasion according to the offset.

The random access occasion and the PUSCH occasion are in time-division multiplexing (TDM) relationships. The PUSCH occasion is a time-frequency resource of the PUSCH.

In an embodiment of the present disclosure, the determining the random access occasion and the PUSCH occasion according to the offset includes determining the random access occasion and the PUSCH occasion in the resource transmitting the random access request at a time after the duration corresponding to the offset after a triggering time of the random access.

Here, taking high-level triggering as the triggering mode of random access as an example, the terminal device determines available RACH occasions and available PUSCH occasions in the PRACH resource after the offset K_offset after the triggering time of the high-level triggering random access, and selects the RACH occasion from the available RACH occasions, and selects the PUSCH occasion from the available PUSCH occasions.

Taking PDCCH order as the triggering mode of random access as an example, the terminal device determines the available RACH occasions and the available PUSCH occasions from PRACH resource after a time corresponding to a duration of greater than the offset K_offset after a last symbol of the PDCCH order, and selects the RACH occasion as the target time from the available RACH occasions, and selects the PUSCH occasion from the available PUSCH occasions. A time interval between the last symbol of the PDCCH order and the RACH occasion as the target time is greater than or equal to K, and the time interval between the last symbol of the PDCCH order and the PUSCH occasion as the target time is greater than or equal to K.

In the embodiment of the present disclosure, a terminal device determines a target time according to an offset which is a time parameter related to a propagation delay between the terminal device and a network device; the terminal device transmits a random access request to the network device based on the target time. The transmission of the random access request is controlled with the propagation delay between the terminal device and the network device. The influence of the propagation delay between the terminal device and the network device on the transmission of the random access request is considered at the transmitting side, so that the time when the random access request reaches the network device is aligned with the resource configured by the network to receive the random access request, which can effectively receive the random access request sent by the terminal device, ensure the interaction of the random access request between the terminal device and the network device, and ensure the normal execution of the random access procedure.

Step S602: the terminal device transmits the random access request to the network device based on the target time.

In the embodiment of the present disclosure, the terminal device transmits the random access request to the network device based on the target time, so that the network device receives the random access request transmitted by the terminal device at the target time.

The terminal device takes the time at a duration corresponding to the offset before the target time as a transmitting time, and transmits a PRACH for carrying the random access request (Msg1) or transmits the PUSCH and the PRACH for carrying the random access request (MsgA) to the network device at the transmitting time.

In an example, the target time is T5, and the time obtained by offsetting T5 backward by a duration of one offset is T6, the terminal device starts to transmit a random access request at T6.

In an implementation, taking the first type of random access as an example, the terminal device transmits the PRACH carrying the random access request at a time after the random access occasion is offset backward by a duration corresponding to the offset.

In an implementation, taking the second type of random access as an example, the terminal device selects an earlier random access occasion or PUSCH occasion from the random access occasion and the PUSCH occasion, and transmits PRACH and PUSCH at a time after the earlier random access occasion or PUSCH occasion is offset backward by a duration of one offset.

In an example, an earlier occasion between the random access occasion and the PUSCH occasion is a random access occasion, and PRACH and PUSCH are transmitted at a time after the random access occasion is offset backward by a duration of one offset.

In an example, the earlier occasion between the random access occasion and the PUSCH occasion is the PUSCH occasion, and PRACH and PUSCH are transmitted at a time after the PUSCH occasion is offset backward by a duration of one offset.

In an embodiment of the present disclosure, the terminal device determines a starting time of the RAR window according to the offset.

In an implementation, the starting time of the RAR window is: in a PDCCH common search space set configured for the terminal, at a control resource set at an earliest time position where the terminal receives PDCCH, where the earliest time position is at a time after a duration corresponding to a specific offset after a last symbol of RACH occasion where the terminal device transmits a PRACH, and the duration corresponding to the specific offset is a sum of a specific duration and the duration corresponding to the offset.

The specific duration can be a duration corresponding to at least one symbol.

Figure 8:
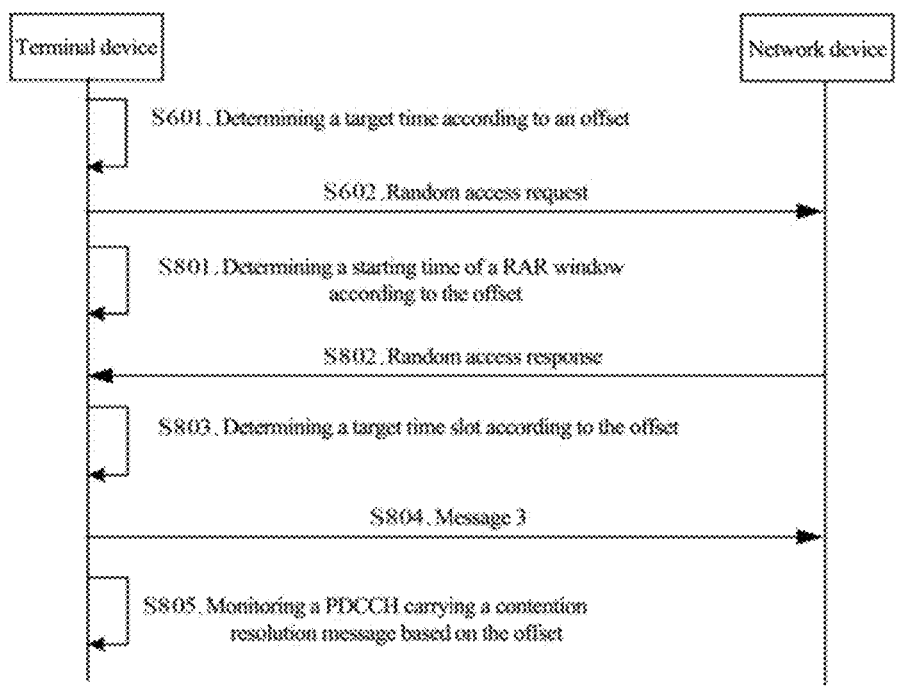
FIG. 8 is a schematic diagram of an optional processing flow for a random access method according to an embodiment of the present disclosure.

After step S602 is performed, as shown in FIG. 8, the method includes:
 step S801: the terminal device determines the starting time of the RAR window according to the offset.

The RAR window is used to monitor a RAR message issued by the network device.

In an implementation, the RAR window is used to monitor the PDCCH carrying the RAR message.

Step S802: the network device transmits a random access response to the terminal device.

At this time, the terminal device monitors the random access response issued by the network device based on the RAR window.

After receiving the random access request sent by the terminal device based on step S602, the network device transmits the RAR message to the terminal device, and the terminal device monitors the issuing of the RAR message based on the RAR window.

In an implementation, the random access is the first type of random access, and the RAR message is Msg2. In an implementation, the random access is the second type of random access, and the RAR message is MsgB.

In an embodiment of the present disclosure, when the random access is the first type of random access, the terminal device determines a target time slot according to the offset; and the terminal device transmits a PUSCH for carrying message 3 based on the target time slot.

In an implementation, the determining the target time slot according to the offset includes determining the target time slot according to a reference time slot and the offset, where the reference time slot is a time slot in which a physical downlink shared channel PDSCH carrying a random access response RAR message is received.

When the terminal device receives the PDSCH carrying the RAR message in a reference slot n, The terminal device transmits a PUSCH carrying message 3 in a target slot n'; where the time slot n' can be calculated by formula (2), $$n' = n + k_2 + \Delta + \text{K\_offset} \quad \text{Formula (2)}$$

In an embodiment of the present disclosure, as shown in FIG. 8, after step S802 is executed, step S803 and step S804 are included.

Step S803: the terminal device determines a target time slot according to the offset.

Step S804: the terminal device transmits a PUSCH for carrying message 3 based on the target time slot.

Here, the terminal device transmits a PUSCH for carrying message 3 based on the target time slot, so as to transmit the message 3 to the network device.

In an embodiment of the present disclosure, when the random access is the first type of random access, after transmitting the Msg2, the network device receives the PUSCH carrying the message 3 according to the offset.

In an implementation, the monitoring the PUSCH carrying message 3 according to the offset includes:

receiving the PUSCH carrying message 3 after a duration corresponding to the offset after a time when the random access response RAR is transmitted.

The network device receives the PUSCH carrying Msg3 after the offset after transmitting Msg2.

In an example, the network device transmits Msg2 at T5, and the time corresponding to a duration of K_offset after T5 is T6, and the network device starts to receive the PUSCH carrying Msg3 at T6.

In an embodiment of the present disclosure, when the random access is the first type of random access, the terminal device monitors a PDCCH carrying a contention resolution message based on the offset.

After receiving Msg3, the network device issues Msg4, that is, a contention resolution message to the terminal device, and the network device issues the contention resolution message based on PDCCH. After transmitting Msg3, the terminal device monitors the PDCCH carrying the contention resolution message to monitor the contention resolution message issued by the network device.

In an implementation, the terminal device monitors the PDCCH carrying the contention resolution message based on the random access contention resolution timer.

The manner in which the terminal device monitors the PDCCH carrying the contention resolution message based on the random access contention resolution timer includes any of the following modes.

Mode 1

The random access contention resolution timer is started at a time after a duration corresponding to the offset after the time of transmitting message 3, and the random access contention resolution timer is restarted at a first symbol after the duration corresponding to the offset after the time of retransmitting message 3; where during the operation of the random access contention resolution timer, the PDCCH carrying the contention resolution message is monitored.

In mode 1, the random access contention resolution timer is restarted at a time after offsetting forward the time of transmitting the message 3 by a duration corresponding to K_offset. The random access contention resolution timer is restarted at the first symbol after offsetting forward the time of retransmitting message 3 by the duration corresponding to K_offset, and the PDCCH carrying the contention resolution message is started to be monitored after the random access contention resolution timer runs.

Mode 2

The random access contention resolution timer is started after message 3 is transmitted, and the random access contention resolution timer is restarted after message 3 is retransmitted; where the PDCCH carrying the contention resolution message is monitored after the random access contention resolution timer runs for the duration corresponding to the offset.

In mode 2, the random access contention resolution timer is started after the time of transmitting message 3. The random access contention resolution timer is restarted at a first symbol after the time of retransmitting message 3, and the PDCCH carrying the contention resolution message is started to be monitored after the random access contention resolution timer runs for a duration corresponding to K_offset.

In an embodiment of the present disclosure, as shown in FIG. 8, after step S804 is executed, the method includes:

step S805: the terminal device monitors the PDCCH carrying the contention resolution message based on the offset.

It should be noted that in the embodiments of the present disclosure, a value of the offset corresponding to different random access messages may be different or the same.

In an example, a terminal device determines a target time according to an offset K_offset A to transmit a random access request based on the target time, determines a starting time of RAR window according to an offset K_offset B, determines a target time slot for transmitting Msg3 according to K_offset C and controls the random access contention resolution timer according to K_offset D, and values of K_offset A, K_offset B, K_offset C and K_offset D are different.

In an example, a terminal device determines a target time according to an offset K_offset A to transmit a random access request based on the target time, determines a starting time of RAR window according to the offset K_offset A, determines a target time slot for transmitting Msg3 according to K_offset A and controls the random access contention resolution timer according to K_offset A.

In the embodiments of the present disclosure, in the random access procedure, transmitting or receiving of each message in the random access procedure is controlled by an offset which is a time parameter related to a propagation delay between the terminal device and a network device. Thus, the influence of the propagation delay between the terminal device and the network device on the transmission of messages in the random access procedure is considered for message transmission, so that the time when the network device receives messages in the random access procedure is aligned with the time for receiving messages configured by the network, or the time when the terminal device monitors messages in the random access procedure is aligned with the time when the messages are received, which can effectively ensure the message interaction between terminal device and network device in the random access procedure, and ensure the normal execution of the random access procedure.

In the following, taking a communications satellite as the network device and a UE as the terminal device as an example, the random access method provided by the embodiments of the present disclosure is illustrated through different examples.

Example 1: 4-Step RACH

Step 901: the UE transmits Msg1 to the communications satellite.

If a high-level or a PDCCH order triggers the 4-step RACH process for the UE, the UE transmits Msg1.

Based on the configuration of PRACH resource, the UE selects an appropriate RACH occasion based on K_offset and determines the PRACH transmission time, where K_offset is a time parameter related to a propagation delay between the communications satellite and the terminal, which is used for the UE to adjust the transmission timing of PRACH, so as to deal with the influence of the propagation delay between the communications satellite and the UE.

In an implementation, K_offset is transmitted by the communications satellite to the UE through signaling, and the signaling may be a system broadcast message, a PDCCH, a RRC signaling, a MAC CE signaling, etc.

In an implementation, K_offset is a predefined value.

Based on different triggering modes of the random access procedure, the methods of selecting the appropriate RACH occasion based on K_offset and determining the transmission time of the PRACH are different.

a. High-Level Triggers Random Access Procedure

Step S8011a: the UE determines a next available RACH occasion in the PRACH resource after a period of K_offset1 after the random access is triggered by the high level.

Figure 9:
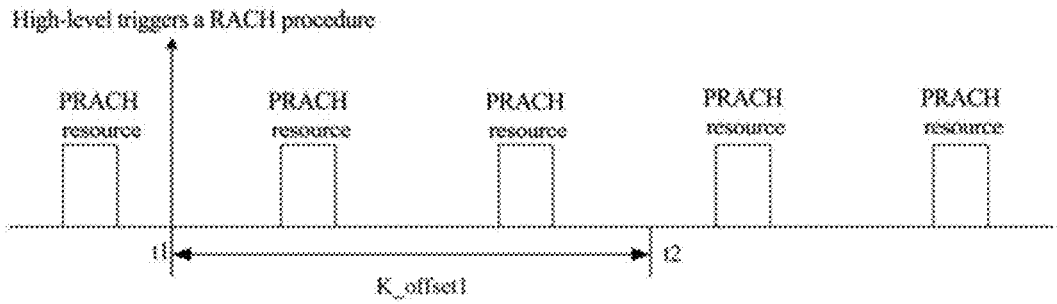
FIG. 9 is a schematic diagram of an optional timing relationship according to an embodiment of the present disclosure.

As shown in FIG. 9, random access is triggered by the high level for the UE at time t1, and the UE determines available RACH occasions in the PRACH resource after time t2 which is a time at a period of K_offset1 after t1, and selects the RACH occasion from the available RACH occasions, and select a preamble in the selected RACH occasion. In an implementation, the UE selects the RACH occasion from the available RACH occasions based on a measurement result of a reference signal (such as SS/PBCH blocks, CSI-RSs).

It can be seen from FIG. 9 that PRACH resource is a periodic resource, and the UE determines the available RACH occasions in the PRACH resources after the time t2 at the period of K_offset1 after t1.

Step S8012a: the terminal transmits a PRACH based on a determined time position of the RACH occasion and K_offset1.

Figure 10:
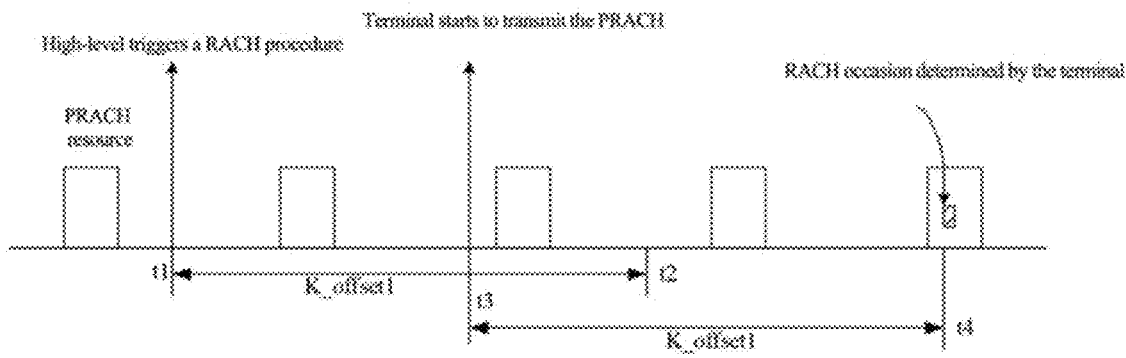
FIG. 10 is a schematic diagram of an optional timing relationship according to an embodiment of the present disclosure.

As shown in FIG. 10, a determined starting time of the RACH occasion is t4, and the UE starts to transmit the PRACH at time t3 corresponding to the time of t4 minus K_offset1.

b. PDCCH Order Triggers the Random Access Procedure

Step S8011b: the UE determines a next available RACH occasion in the PRACH resource based on K_offset2 and a time of a last symbol of the PDCCH order.

If the random access procedure is triggered by a PDCCH order, the UE transmits the PRACH in a RACH occasion determined according to the PDCCH order and K_offset2, where a time interval between a last symbol of the PDCCH order (timing at the base station side) or a last symbol received in the PDCCH order (timing at the terminal side) and a first symbol of the RACH occasion is greater than or equal to a time interval K.

The time interval $K=N_{T,2}+\Delta_{BWPSwitching}+\Delta_{Delay}+K\_offset2$, where $N_{T,2}$ is a time length of $N_2$ symbols corresponding to PUSCH preparation time of rel-15 terminal processing capacity 1. If the active UL bandwidth part (BWP) of the terminal does not change, the BWP handover delay $\Delta BWPSwitchtng=0$, otherwise, the value of the BWP handover delay $\Delta_{BWPSwitching}$ can refer to the definition in Table 5. For FR1, the time delay $\Delta_{Delay}=0.5$ ms, and for the FR2, the time delay $\Delta_{Delay}=0.25$ ms.

For the timing at the terminal side, K_offset2 is a propagation delay between the communications satellite and the terminal; for the timing at the satellite side, K_offset2 is twice the propagation delay between the communications satellite and the terminal.

Step s8012b: the terminal transmits a PRACH based on a determined time position of the RACH occasion and K_offset2.

In this embodiment, with the method in which the selection of PRACH resource and the time of transmitting the PRACH are based on the propagation delay between the communications satellite and the terminal, the PRACH transmitted by the terminal, which endures a long period of propagation delay, is aligned with the PRACH resource position configured by the communications satellite, so as to ensure the normal execution of the random access procedure in NTN.

Step 902: Msg2 is received.

After the UE transmits a preamble through Msg1, Msg1 from the terminal to the satellite needs to experience a propagation delay determined by a distance between the satellite and the UE. After the communications satellite detects the preamble, the communications satellite transmits a RAR message to the UE. The RAR message to the UE needs to experience the propagation delay determined by the distance between the satellite and the UE. Therefore, after the UE transmits msg1, an earliest time when the terminal may detect the RAR message (Msg2) is at a time after K_offset3.

The RAR window for the terminal can be determined by K_offset3.

Figure 11:
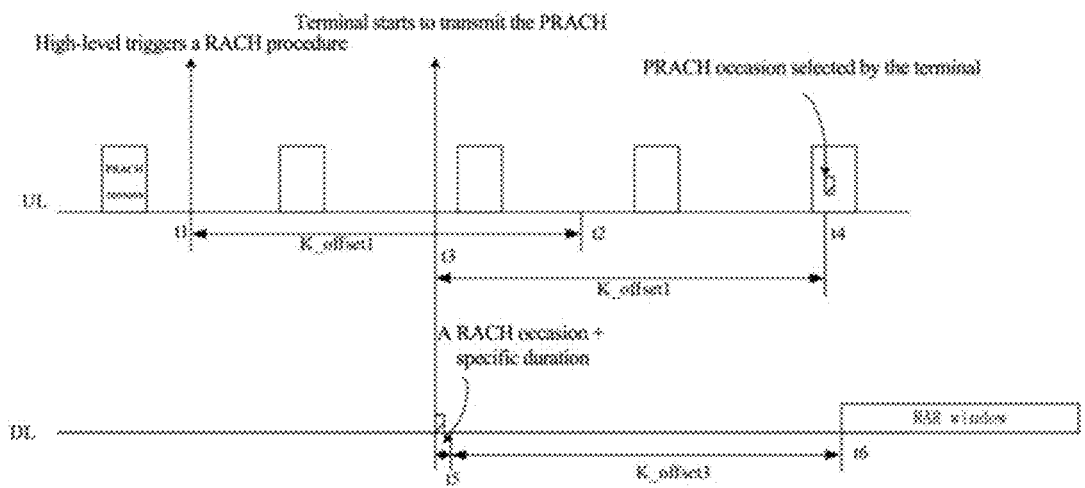
FIG. 11 is a schematic diagram of an optional timing relationship according to an embodiment of the present disclosure.

Specifically, the RAR window starts in the PDCCH common search, space set configured for the terminal, and is at a control resource set at an earliest time position where the terminal receives PDCCH after a time (t6 in FIG. 11) which follows K_offset3 plus a specific duration after a last symbol of the RACH occasion where the terminal transmits the PRACH (the time at the specific duration after the last symbol of the RACH occasion is t5 in FIG. 11), and the specific duration is at least one symbol, and a symbol length of the at least one symbol corresponds to a subcarrier interval of Type1-PDCCH CSS set. K_offset3 is determined by the distance between the satellite and the terminal, such as equal to twice the propagation delay between the satellite and the terminal.

In an example, as shown in FIG. 11, based on the UL shown in FIG. 10, the UE transmits the PRACH at time t3. For DL, the RAR window for the UE to monitor the PDCCH starts in the PDCCH common search space set configured for the terminal, and is at a control resource set at an earliest time position where the terminal receives PDCCH after the time t6 which is after a last symbol of the RACH occasion where the terminal transmits the PRACH. As shown in FIG. 11, t3 is offset forward by a RACH occasion and then the time at a specific duration after a last symbol of the RACH occasion is t5, and the time following t5 plus the duration of K_offset3 is t6, that is, a time interval between t3 and t5 is a sum of the duration of a RACH occasion and the specific duration, and a time interval between t6 and t5 is K_offset3.

Beneficial effects: the starting position of RAR window is determined based on the propagation delay between UE and communications satellite, so that the terminal does not monitor the PDCCH carrying the RAR message immediately after transmitting Msg1, but starts to monitor the PDCCH carrying RAR message after the delay of RAR message reaching the terminal, which not only ensures the monitoring of RAR message, but also saves the power consumption of the terminal for monitoring the RAR message.

Step 903: the terminal transmits Msg3.

In NTN, corresponding to the PUSCH transmission time slot scheduled by the RAR uplink scheduling authorization, if the UE receives the PDCCH carrying the RAR message in time slot n, the UE transmits the PUSCH carrying Msg3 to the communications satellite in time slot $n+k_2+\Delta+K\_offset4$.

K_offset4 is determined by the distance between the communications satellite and the terminal, for example, which is twice the propagation delay determined by the distance between the communications satellite and the UE.

In the embodiment of the present disclosure, which is based on the propagation delay between the terminal and the communications satellite, it is ensured that the transmission of Msg3 considers the influence of the propagation delay, so that the communications satellite can receive the PUSCH carrying Msg3 at a correct time position.

Step 904: the terminal receives a contention resolution message.

In NTN, the terminal has transmitted Msg3, and the MAC entity of the terminal can perform one of the following modes.

Mode 1
1>. After a period of K_offset5, the terminal starts the ra-ContentResolutionTimer and restarts the ra-ContentionResolutionTimer at a first symbol after a period of K_offset5 after retransmitting each msg3;
2>. During the operation of Ra-ContentionResolutionTimer, PDCCH is monitored, that is, the contention resolution message transmitted by the satellite is monitored.

Mode 2
1>. Ra-ContentionResolutionTimer is started and Ra-ContentionResolutionTimer is restarted at a first symbol after each restransmitting of Msg3;
2>. During the operation after a period greater than K_offset5 from the timing of ra-ContentionResolutionTimer, the PDCCH is monitored, that is, the contention resolution message transmitted by the network is monitored.

K_offset5 is determined by the distance between the communications satellite and the terminal, such as equal to twice the propagation delay determined by the distance between the communications satellite and the terminal.

In the embodiment of the present disclosure, based on the propagation delay between the terminal and the communications satellite, the starting time for the terminal to monitor the PDCCH is delayed, which not only ensures the correct reception of the contention resolution message, but also saves the power consumption of the terminal.

Example 2: 2-Step RACH

Step 1001: the UE transmits MsgA to the communications satellite.

The transmission of MsgA in 2-step RACH process includes the transmission of PRACH and PUSCH. The UE determines the selected time to transmit the PRACH and the PUSCH in the following manners.

Selecting appropriate time according to K_offset and determine the sending time of PRACH.

a. High Level Triggers the Random Access Procedure
1>. A next available RACH occasion and a next available PUSCH occasion are determined in the msgA resources after a period of K_offset1 after the random access is triggered by the higher layer.
2>. Based on K_offset1 and a time position of an earlier occasion between the next available RACH occasion and the next available PUSCH occasion, the terminal transmits the PRACH and the PUSCH. Here, the RACH occasion and the PUSCH occasion are in a TDM relationship.

In an implementation, the time position of the RACH occasion is earlier in time, and the PRACH and the PUSCH start to be transmitted at a time after offsetting the RACH occasion backward by the duration corresponding to K_offset1.

In an implementation, the time position of the PUSCH occasion is earlier, the PRACH and the PUSCH start to be transmitted at a time after offsetting the PUSCH occasion backward by the duration corresponding to K_offset1.

b. PDCCH Order Triggers the Random Access Procedure
1>. The UE determines a next available RACH occasion and a next available PUSCH occasion in the msgA resources based on K_offset2 and the time of a last symbol of the PDCCH order.

A time interval between the last symbol of the PDCCH order (timing at the communications satellite side) or the last symbol received in the PDCCH order (timing at the terminal side) and a first symbol of the RACH occasion is greater than or equal to a time interval K.

A time interval between the last symbol of the PDCCH order (timing at the communications satellite side) or the last symbol received in the PDCCH order (timing at the terminal side) and a first symbol of the PUSCH occasion is greater than or equal to the time interval K.

2> Based on K_offset1 and a time position of an earlier occasion between the next available RACH occasion and the next available PUSCH occasion, the terminal transmits the PRACH and the PUSCH. Here, the RACH occasion and the PUSCH occasion are in a TDM relationship.

The selection of MsgA resources and the determination of transmission time are similar to those for msg1 of 4-step RACH process in example 1, and the description of the example 1 can be referred to, and the details will not be repeated.

Step 1002: the UE receives MsgB transmitted by the communications satellite.

The setting of the starting time position of RAR window is similar to that of the 4-step RACH in example 1, which starts in the PDCCH CSS set configured for the terminal, and is in a CORESET at an earliest time position where the terminal receives PDCCH after a time at K_offset6 plus at least one symbol after a last symbol of the PUSCH occasion where the terminal transmits msgA, and a symbol length of the at least one symbol corresponds to a subcarrier interval of Type1/X-PDCCH CSS set.

The terminal monitors the PDCCH in the RAR response window and receives the PDSCH carrying the RAR message scheduled by the PDCCH.

K_offset6 is determined by the distance between the satellite and the terminal, for example, equal to twice the propagation delay determined by the distance between the satellite and the terminal.

It should be noted that in the above examples, values of K_offset1, K_offset2, K_offset3, K_offset4, K_offset5 and K_offset6 may be the same or different.

In a practical application, when values of K_offset1 K_offset2, K_offset3, K_offset4 K_offset5 and K_offset6 are the same, K_offset1 K_offset2, K_offset3, K_offset4, K_offset5 and K_offset6 may be the same K_offset.

Figure 12:
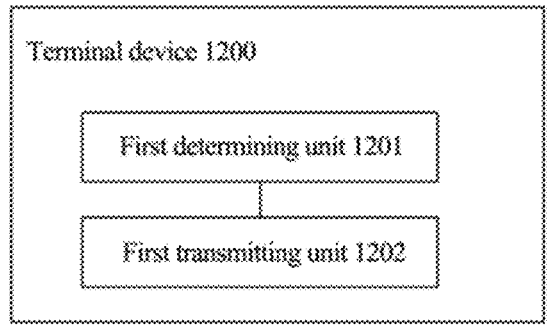
FIG. 12 is an optional structural schematic diagram of a terminal device according to an embodiment of the present disclosure.

In order to implement the above random access method, an embodiment of the present disclosure further provides a terminal device. The structure of the terminal device is shown in FIG. 12, and a terminal device 1200 includes:

- a first determining unit 1201 configured to determine a target time according to an offset which is a time parameter related to a propagation delay between the terminal device and a network device; and
- a first transmitting unit 1202 configured to transmit a random access request to the network device based on the target time.

In an embodiment of the present disclosure, the offset is predefined by the terminal device; or the offset is configured by the network device.

In an embodiment of the present disclosure, when the offset is configured by the network device, the offset is configured by the network device through at least one of the following signaling:

- a system broadcast message;
- a physical downlink control channel PDCCH signaling;
- a radio resource control signaling; and
- a media access control control element signaling.

In an embodiment of the present disclosure, the first determining unit 1201 is further configured to determine a random access occasion according to the offset when the random access is a first type of random access.

In an embodiment of the present disclosure, the first determining unit 1201 is further configured to determine the random access occasion in a physical random access channel (PRACH) resource after a duration corresponding to the offset after a triggering time of a random access.

In an embodiment of the present disclosure, the first determining unit 1201 is further configured to determine the random access occasion in the PRACH resource according to a last symbol of a PDCCH order and the offset when a triggering of the random access is in a mode of triggering by the PDCCH order, where a time interval between the last symbol of the PDCCH order and a first symbol of the random access occasion is greater than the duration corresponding to the offset.

In an embodiment of the present disclosure, the first determining unit 1201 is further configured to determine the random access occasion and a physical uplink shared channel (PUSCH) occasion according to the offset when the random access is a second type of random access.

In an embodiment of the present disclosure, the first determining unit 1201 is further configured to:

- determine the random access occasion and the PUSCH occasion in resources for transmitting a random access request after the duration corresponding to the offset after the triggering time of a random access.

In an embodiment of the present disclosure, the terminal device 1200 further includes:

- a second determining unit 1301 configured to determine a starting time of a random access response (RAR) window according to the offset.

In an embodiment of the present disclosure, the starting time of the RAR window is: in a PDCCH common search space set configured for a terminal, and at a control resource set at an earliest time position where the terminal receives PDCCH, where the earliest time position is at a time after a duration corresponding to a specific offset after a last symbol of a random access occasion where the terminal transmits a PRACH, where the duration corresponding to the specific offset is a sum of a specific duration and the duration corresponding to the offset.

In an embodiment of the present disclosure, the terminal device 1200 further includes:

- a third determining unit 1401 configured to determine a target time slot according to the offset; and
- a second transmitting unit 1402 configured to transmit a physical uplink shared channel PUSCH for carrying uplink data of message 3 based on the target time slot.

In an embodiment of the present disclosure, the third determining unit 1401 is further configured to determine the target time slot according to a reference time slot and the offset, where the reference time slot is a time slot in which a physical downlink shared channel (PDSCH) carrying a RAR message is received.

In an embodiment of the present disclosure, the terminal device further includes:

- a monitoring unit 1501 which monitors a PDCCH carrying a contention resolution message based on the offset.

In an embodiment of the present disclosure, the monitoring unit 1501 is further configured to:

- start a random access contention resolution timer after a time at the duration corresponding to the offset after the time of transmitting message 3, and restart the random access contention resolution timer at a first symbol after the duration corresponding to the offset after a time of retransmitting message 3; where the PDCCH carrying the contention resolution message is monitored during the operation of the random access contention resolution timer.

In an embodiment of the present disclosure, a monitoring unit 1501 is further configured to:

- start a random access contention resolution timer after message 3 is transmitted, and restart the random access contention resolution timer after message 3 is retransmitted; where the PDCCH carrying the contention resolution message is monitored after the random access contention resolution timer runs for the duration corresponding to the offset.

An embodiment of the present disclosure further provides a terminal device, including a processor and a memory for storing a computer program that is runnable on the processor, where the processor is used to execute the steps of the random access method executed by the terminal device as described above when running the computer program.

Figure 13:
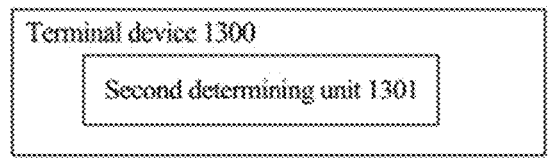
FIG. 13 is a schematic diagram of an optional structure of a terminal device according to an embodiment of the present disclosure.

An embodiment of the present disclosure further provides a terminal device. The structure of the terminal device is shown in FIG. 13. A terminal device 1300 includes:

- a second determining unit 1301 configured to determine a starting time of a random access response (RAR) window according to a offset which is a time parameter related to a propagation delay between the terminal device and a network device.

In an embodiment of the present disclosure, the starting time of the RAR window is: in a physical downlink control channel (PDCCH) common search space set configured for a terminal, and at a control resource set at an earliest time position where the terminal receives PDCCH, where the earliest time position is at a time after the duration corresponding to a specific offset after a last symbol of a random access occasion where the terminal device transmits a physical random access channel (PRACH), where the duration corresponding to the specific offset is a sum of a specific duration and the duration corresponding to the offset.

An embodiment of the present disclosure further provides a terminal device, including a processor and a memory for storing a computer program that is runnable on the processor, where the processor is used to execute the steps of the random access method executed by the terminal device as described above when running the computer program.

Figure 14:
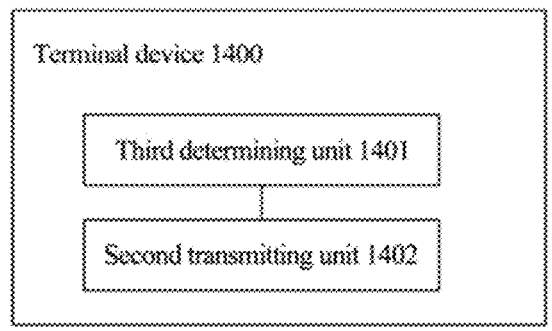
FIG. 14 is a schematic diagram of an optional structure of a terminal device according to the embodiment of the present disclosure.

An embodiment of the present disclosure further provides a terminal device. The structure of the terminal device is shown in FIG. 14. A terminal device 1400 includes:
  a third determining unit 1401 configured to determine a target time slot according to an offset which is a time parameter related to a propagation delay between the terminal device and a network device; and
  a second transmitting unit 1402 configured to transmit a physical uplink shared channel (PUSCH) for carrying uplink data of message 3 based on the target time slot.

In an embodiment of the present disclosure, the third determining unit 1401 is also configured to determine the target time slot according to a reference time slot and the offset, where the reference time slot is a time slot in which a physical downlink shared channel (PDSCH) carrying a RAR message is received.

An embodiment of the present disclosure further provides a terminal device, including a processor and a memory for storing a computer program that is runnable on the processor, where the processor is used to execute the steps of the random access method executed by the terminal device as described above when running the computer program.

Figure 15:
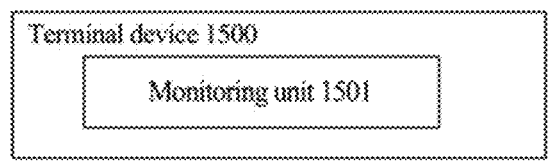
FIG. 15 is a schematic diagram of an optional structure of a terminal device according to an embodiment of the present disclosure.

In order to implement the above random access method, an embodiment of the present disclosure further provides a terminal device. The structure of the terminal device is shown in FIG. 15. A terminal device 1500 includes:
  a monitoring unit 1501 configured to monitor a physical downlink control channel (PDCCH) carrying a contention resolution message based on an offset which is a time parameter related to a propagation delay between the terminal device and a network device.

In an embodiment of the present disclosure, the monitoring unit 1501 is further configured to:
  start a random access contention resolution timer at a time after the duration corresponding to the offset after the time of transmitting message 3, and restart the random access contention resolution timer at a first symbol after the duration corresponding to the offset after a time of retransmitting message 3; where the PDCCH carrying the contention resolution message is monitored during the operation of the random access contention resolution timer.

In an embodiment of the present disclosure, the monitoring unit 1501 is further configured to:
  start a random access contention resolution timer after message 3 is transmitted, and restart the random access contention resolution timer after message 3 is retransmitted; where the PDCCH carrying the contention resolution message is monitored after the random access contention resolution timer runs for the duration corresponding to the offset.

An embodiment of the present disclosure further provides a terminal device, including a processor and a memory for storing a computer program that is runnable on the processor, where the processor is used to execute the steps of the random access method executed by the terminal device as described above when running the computer program.

Figure 16:
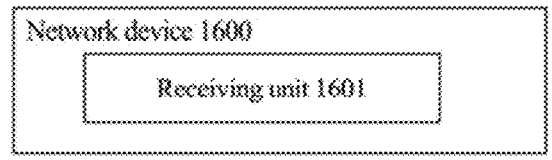
FIG. 16 is a schematic diagram of an optional structure of a network device according to an embodiment of the present disclosure.

An embodiment of the present disclosure further provides a network device. The structural diagram of the network device is shown in FIG. 16. A network device 1600 includes:
  a receiving unit 1601 configured to receive a physical uplink shared channel PUSCH carrying message 3 according to an offset which is a time parameter related to a propagation delay between a terminal device and the network device.

In an embodiment of the present disclosure, the receiving unit 1601 is further configured to receive the PUSCH carrying message 3 after a duration corresponding to the offset after a time of transmitting a random access response RAR.

An embodiment of the present disclosure further provides a network device, including a processor and a memory for storing a computer program that is runnable on the processor, where the processor is used to execute the steps of the random access method executed by the network device as described above when running the computer program.

Figure 17:
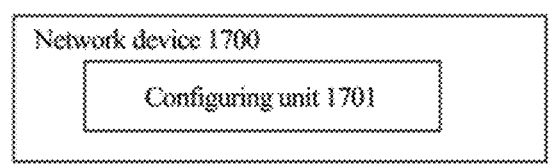
FIG. 17 is a schematic diagram of an optional structure of a network device according to an embodiment of the present disclosure.

An embodiment of the present disclosure further provides a network device. The structural diagram of the network device is shown in FIG. 17. A network device 1700 includes:
  a configuring unit 1701 configured to configure an offset to a terminal device, where the offset is a time parameter related to a propagation delay between the terminal device and the network device, and is used for the terminal device to control transmitting of a random access request or message 3, or receiving of a random access response or a contention resolution message.

In an embodiment of the present disclosure, the configuring unit 1701 is further configured to transmit a configuration message carrying the offset to the terminal device.

In an embodiment of the present disclosure, the configuration message includes at least one of the following:
  a system broadcast message;
  a physical downlink control channel (PDCCH) signaling;
  a radio resource control signaling; and
  a media access control control element signaling.

In an embodiment of the present disclosure, the network device 1700 further includes:
  a receiving unit 1601 configured to receive a physical uplink shared channel (PUSCH) carrying message 3 according to the offset.

In an embodiment of the present disclosure, the receiving unit 1601 is further configured to receive the PUSCH carrying message 3 after a duration corresponding to the offset after a time of transmitting a random access response RAR.

An embodiment of the present disclosure further provides a network device, including a processor and a memory for storing a computer program that is runnable on the processor, where the processor is used to execute the steps of the random access method executed by the network device as described above when running the computer program.

Figure 18:
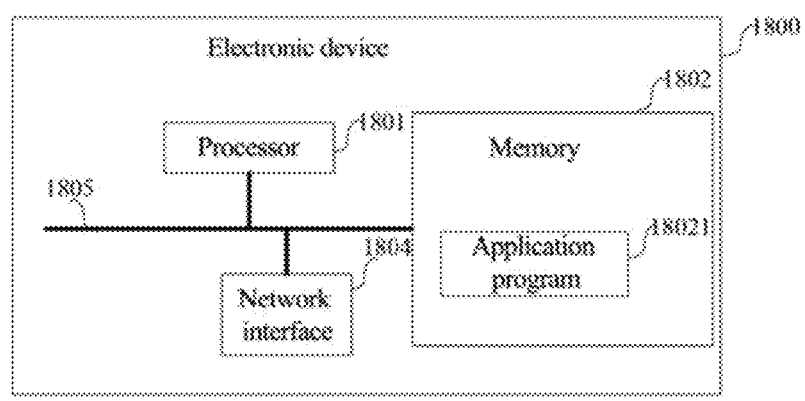
FIG. 18 is a schematic diagram of an optional structure of an electronic device according to an embodiment of the present disclosure.

FIG. 18 is a schematic diagram of a hardware structure of an electronic device (a terminal device or a network device) according to an embodiment of the present disclosure. An electronic device 1800 includes at least one processor 1801, a memory 1802 and at least one network interface 1804. The various components in the electronic device 1800 are coupled together through a bus system 1805. It is understood that the bus system 1805 is used to implement connection communication between these components. In addition to a data bus, the bus system 1805 also includes a power bus, a control bus and a status signal bus. However, for the sake of clarity, various buses are all labeled as the bus system 1805 in FIG. 18.

It is understood that the memory 1802 may be a volatile memory or a nonvolatile memory, or may include both volatile and nonvolatile memories. Among them, the nonvolatile memory can be a ROM, a programmable read-only memory (PROM), an erasable programmable read-only memory (EPROM), an electrically erasable programmable read-only memory (EEPROM), and a ferromagnetic random access memory (FRAM), a flash memory, a magnetic surface memory, an optical disc, or compact disc read-only memory (CD-ROM); the magnetic surface memory may be a magnetic disk memory or a magnetic tape memory. The volatile memory may be a random access memory (RAM), which is used as an external cache. By way of exemplary but non-limiting illustrations, many forms of RAM are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synclink dynamic random access memory (SLDRAM), a direct rambus random access memory (DRRAM). The memory 1802 described in embodiments of the present disclosure is intended to include, but is not limited to, these and any other suitable types of memories.

The memory 1802 in the embodiments of the present disclosure is used to store various types of data to support the operation of the electronic device 1800. Examples of such data include: any computer program used to operate on the electronic device 1800, such as an application program 18021. The program for implementing the method of the embodiments of the present disclosure may be included in the application program 18021.

The method disclosed in the above embodiments of the present disclosure may be applied to the processor 1801 or implemented by the processor 1801. The processor 1801 may be an integrated circuit chip with a signal processing capability. In the implementation process, the steps of the above method can be completed by an integrated logic circuit of hardware or an instruction in the form of software in the processor 1801. The above processor 1801 may be a general-purpose processor, a digital signal processor (DSP), or other programmable logic devices, discrete gates or transistor logic devices, discrete hardware components, etc. The processor 1801 may implement or execute various methods, steps and logical block diagrams disclosed in the embodiments of the present disclosure. The general-purpose processor can be a microprocessor or any conventional processor, etc. The steps of the method disclosed in combination with the embodiments of the present disclosure may be directly embodied as being executed and completed by a hardware decoding processor, or executed and completed by a combination of hardware and software modules in the decoding processor. The software module may be located in a storage medium, and the storage medium is located in the memory 1802. The processor 1801 reads the information in the memory 1802, and completes the steps of the above method in combination with its hardware.

In an exemplary embodiment, the electronic device 1800 may be implemented by one or more application specific integrated circuits (ASIC), DSP, programmable logic device (PLD), complex programmable logic device (CPLD), FPGA, general-purpose processor, controller, MCU, MPU, or other electronic components for performing the above method.

An embodiment of the present disclosure further provides a storage medium for storing computer programs.

In an implementation, the storage medium can be applied to a terminal device in the embodiments of the present disclosure, and the computer programs cause the computer to execute the corresponding processes in the various methods of the embodiments of the present disclosure. For simplicity, details are not described herein again.

In an implementation, the storage medium can be applied to the network device in the embodiments of the present disclosure, and the computer programs cause the computer to execute the corresponding processes in the various methods of the embodiments of the present disclosure. For simplicity, details are not repeated here.

The present disclosure is described with reference to flow charts and/or block diagrams of methods, devices (systems), and computer program products according to embodiments of the present disclosure. It should be understood that each process and/or block in the flowchart and/or block diagram and the combination of processes and/or blocks in the flowchart and/or block diagram can be implemented by computer program instructions. These computer program instructions can be provided to the processor of a general-purpose computer, a special-purpose computer, an embedded processor or other programmable data processing device to generate a machine, so that instructions executed by a processor of a computer or other programmable data processing device are caused to generate means for implementing the functions specified in one or more processes in the flowchart and/or one block or more in the block diagram.

These computer program instructions may also be stored in a computer-readable memory that can guide a computer or other programmable data processing device to work in a specific manner, so that the instructions stored in the computer-readable memory produce a manufacturing product including an instruction device, and the instruction device implements the functions specified in one or more flows of the flowchart and/or one or more blocks of the block diagram.

These computer program instructions may also be loaded on a computer or other programmable data processing device, so that a series of operation steps are executed on the computer or other programmable device to produce computer implemented processing, thus, instructions executed on a computer or other programmable device provide steps for implementing the functions specified in one or more flows of the flowchart and/or one or more blocks of the block diagram.

The above only describes preferred embodiments of the present disclosure and is not used to limit the protection scope of the present disclosure. Any modification, equivalent replacement and improvement made within the spirit and principles of the present disclosure shall be included in the protection scope of the present disclosure.

What is claimed is:

1. A random access method, wherein the method comprises:
   determining, by a terminal device, a target time according to an offset; and
   transmitting, by the terminal device, a random access request to a network device based on the target time;
   wherein a type of the random access is a first type of random access, a triggering mode of the random access is triggering by a physical downlink control channel (PDCCH) order, the determining the target time according to the offset comprises:
   determining a random access occasion in a physical random access channel (PRACH) resource according to a last symbol of the PDCCH order and the offset, wherein a time interval between the last symbol of the PDCCH order and a first symbol of the random access occasion is greater than a duration corresponding to the offset.

2. The method according to claim 1, wherein
   the offset is predefined by the terminal device; or
   the offset is configured by the network device.

3. The method according to claim 2, wherein when the offset is configured by the network device, the offset is configured by the network device through at least one of the following signalings:
   a system broadcast message;
   a PDCCH signaling;
   a radio resource control signaling; and
   a media access control control element signaling.

4. The method according to claim 1, wherein the method further comprises:
   determining, by the terminal device, a starting time of a random access response (RAR) window according to the offset.

5. The method according to claim 4, wherein the starting time of the RAR window is: a control resource set in a PDCCH common search space set configured for the terminal device, wherein the control resource set is at an earliest time position where the terminal device receives a PDCCH and the earliest time position is at a time after a duration corresponding to a specific offset after a last symbol of a random access occasion where the terminal device transmits a PRACH, wherein the duration corresponding to the specific offset is a sum of a specific duration and the duration corresponding to the offset.

6. The method according to claim 1, wherein the method further comprises:
   determining, by the terminal device, a target time slot according to the offset; and
   transmitting, by the terminal device, a physical uplink shared channel (PUSCH) for carrying message 3 based on the target time slot.

7. The method according to claim 6, wherein the determining the target time slot according to the offset comprises:
   determining the target time slot according to a reference time slot and the offset, wherein the reference time slot is a time slot in which a physical downlink shared channel (PDSCH) carrying a RAR message is received.

8. The method according to claim 1, wherein the method further comprises:
   monitoring, by the terminal device, a PDCCH carrying a contention resolution message based on the offset.

9. The method according to claim 8, wherein the monitoring the PDCCH carrying the contention resolution message based on the offset comprises:
   starting a random access contention resolution timer at a time after the duration corresponding to the offset after a time of transmitting message 3, and restarting the random access contention resolution timer at a first symbol after the duration corresponding to the offset after a time of retransmitting message 3; wherein the PDCCH carrying the contention resolution message is monitored during operation of the random access contention resolution timer.

10. The method according to claim 8, wherein the monitoring the PDCCH carrying the contention resolution message based on the offset comprises:
    starting a random access contention resolution timer after message 3 is transmitted, and restarting the random access contention resolution timer after message 3 is retransmitted; wherein the PDCCH carrying the contention resolution message is monitored after the random access contention resolution timer runs for the duration corresponding to the offset.

11. A random access method, wherein the method comprises:
    configuring, by a network device, an offset to a terminal device, and the offset is used for the terminal device to control transmitting of a random access request;
    wherein a type of the random access is a first type of random access, a triggering mode of the random access is triggering by a physical downlink control channel (PDCCH) order, the offset is used by the terminal device to determine a random access occasion in a physical random access channel (PRACH) resource according to a last symbol of the PDCCH order and the offset, wherein a time interval between the last symbol of the PDCCH order and a first symbol of the random access occasion is greater than a duration corresponding to the offset.

12. The method according to claim 11, wherein the configuring the offset to the terminal device comprises:
    transmitting a configuration message carrying the offset to the terminal device.

13. The method according to claim 12, wherein the configuration message comprises at least one of the following:
    a system broadcast message;
    a PDCCH signaling;
    a radio resource control signaling; and
    a media access control control element signaling.

14. The method according to claim 11, wherein the method further comprises:
    receiving, by the network device, a physical uplink shared channel (PUSCH) carrying message 3 according to the offset.

15. The method according to claim 14, wherein the receiving the PUSCH carrying message 3 according to the offset comprises:
    receiving the PUSCH carrying message 3 at a time after the duration corresponding to the offset after a time of transmitting a random access response (RAR).

16. A terminal device, comprising a processor and a memory for storing a computer program that is runnable on the processor, wherein when the processor is used to run the computer program, the processor is configured to:
    determine a target time according to an offset; and
    control an output interface to transmit a random access request to a network device based on the target time;
    wherein a type of the random access is a first type of random access, a triggering mode of the random access is triggering by a physical downlink control channel (PDCCH) order, the processor is configured to:

determine a random access occasion in a physical random access channel (PRACH) resource according to a last symbol of the PDCCH order and the offset, wherein a time interval between the last symbol of the PDCCH order and a first symbol of the random access occasion is greater than a duration corresponding to the offset.

17. The terminal device according to claim 16, wherein the offset is predefined by the terminal device; or
the offset is configured by the network device.

18. The terminal device according to claim 17, wherein when the offset is configured by the network device, the offset is configured by the network device through at least one of the following signalings:
a system broadcast message;
a PDCCH signaling;
a radio resource control signaling; and
a media access control control element signaling.

19. The terminal device according to claim 16, the processor is further configured to:
determine a starting time of a random access response (RAR) window according to the offset.

20. A network device, comprising a processor and a memory for storing a computer program that is runnable on the processor, wherein when the processor is used to run the computer program, the processor is configured to:

configure an offset to a terminal device and the offset is used for the terminal device to control transmitting of a random access request;

wherein a type of the random access is a first type of random access, a triggering mode of the random access is triggering by a physical downlink control channel (PDCCH) order, the offset is used by the terminal device to determine a random access occasion in a physical random access channel (PRACH) resource according to a last symbol of the PDCCH order and the offset, wherein a time interval between the last symbol of the PDCCH order and a first symbol of the random access occasion is greater than a duration corresponding to the offset.

21. The network device according to claim 20, wherein when the processor is used to run the computer program, the processor is further configured to:
transmit a configuration message carrying the offset to the terminal device.

22. The network device according to claim 21, wherein the configuration message comprises at least one of the following:
a system broadcast message;
a PDCCH signaling;
a radio resource control signaling; and
a media access control control element signaling.

* * * * *